(12) United States Patent
Nachbagauer et al.

(10) Patent No.: US 12,156,527 B2
(45) Date of Patent: Dec. 3, 2024

(54) SWEETENING COMPOSITIONS

(71) Applicant: Red Bull GmbH, Fuschl am See (AT)

(72) Inventors: Josef Nachbagauer, Fuschl am See (AT); Manfred Urban-Klik, Fuschl am See (AT); Volker Boehringer, Fuschl am See (AT)

(73) Assignee: Red Bull GmbH, Fuschl am See (AT)

( * ) Notice: Subject to any disclaimer, the term of this patent is extended or adjusted under 35 U.S.C. 154(b) by 584 days.

(21) Appl. No.: 17/362,926

(22) Filed: Jun. 29, 2021

(65) Prior Publication Data

US 2021/0321646 A1    Oct. 21, 2021

Related U.S. Application Data

(62) Division of application No. 15/395,432, filed on Dec. 30, 2016, now Pat. No. 11,076,619.

(51) Int. Cl.
| | |
|---|---|
| A23L 2/60 | (2006.01) |
| A23L 27/00 | (2016.01) |
| A23L 27/30 | (2016.01) |

(52) U.S. Cl.
CPC ............ *A23L 2/60* (2013.01); *A23L 27/36* (2016.08); *A23L 27/70* (2016.08); *A23L 27/88* (2016.08); *A23V 2002/00* (2013.01)

(58) Field of Classification Search
CPC . A23L 2/60; A23L 27/36; A23L 27/70; A23L 27/88; A23V 2002/00
See application file for complete search history.

(56) References Cited

U.S. PATENT DOCUMENTS

| | | | |
|---|---|---|---|
| 8,962,698 B2 | 2/2015 | Bridges et al. | |
| 2007/0116824 A1* | 5/2007 | Prakash | A61P 15/00 |
| | | | 426/548 |
| 2007/0148308 A1 | 6/2007 | Niwa | |
| 2011/0293538 A1* | 12/2011 | Ley | A23L 27/86 |
| | | | 514/777 |
| 2014/0170083 A1* | 6/2014 | Ley | A23L 27/36 |
| | | | 424/49 |
| 2015/0189904 A1 | 7/2015 | Prakash et al. | |
| 2016/0198750 A1 | 7/2016 | Carlson et al. | |

FOREIGN PATENT DOCUMENTS

| | | |
|---|---|---|
| AU | 2011203233 A1 | 7/2011 |
| EP | 2386211 A1 | 11/2011 |
| EP | 2474240 A1 | 7/2012 |
| EP | 2486806 A1 | 8/2012 |
| EP | 2519118 B1 | 5/2016 |
| EP | 3017708 A1 | 5/2016 |
| WO | 2008/049256 A1 | 5/2008 |
| WO | 2008/112967 A1 | 9/2008 |
| WO | 2008/147726 A1 | 12/2008 |
| WO | 2010/014813 A2 | 2/2010 |
| WO | 2011/146463 A2 | 11/2011 |
| WO | 2012/073121 A2 | 6/2012 |
| WO | 2012/109585 A1 | 8/2012 |
| WO | 2012/177727 A1 | 12/2012 |
| WO | 2013/060746 A1 | 5/2013 |

OTHER PUBLICATIONS

Database GNPD, "Feine Süsse Vanilla Sweetener," XP055781638 Database Accession No. 264684, 2004. (2 pages).
Database GNPD, "Granulated Sweetener," XP055781641 Database Accession No. 1971449, 2013. (3 pages).
Database GNPD, "Natural Sweetener with Stevia Extract and Thaumatin," XP055781643 Database Accession No. 3464687, 2015. (3 pages).
Database GNPD, "Low Calorie Sugar with Stevia Extract," XP055781644 Database Accession No. 3490401, 2015. (3 pages).
European Search Report, dated Mar. 4, 2021, for European Application No. 20214587. (11 pages).

* cited by examiner

*Primary Examiner* — Anthony J Weier
(74) *Attorney, Agent, or Firm* — Seed IP Law Group LLP

(57) ABSTRACT

The present disclosure provides a sweetening composition including a) acesulfam or aspartame, b) sucralose, a stevia compound, saccharin or cyclamate, c) neohesperidin, thaumatine, rubusoside, a rubusoside derivative, phloretin, trilobatin, monatin and/or hesperetin, and d) tannin in an amount in the range from 1 mg/l to 400 mg/l or wherein, based on the total weight of components a), b), c) and d), the component a) is present in an amount in the range from 10 to 50 wt-%, component b) in an amount in the range from 15 to 65 wt-%, component c) in an amount in the range from 0.1 to 4 wt-%, and component d) in an amount in the range from 5 to 50 wt-%. Moreover, the present disclosure is about the use of said sweetening compositions for sweetening and preparing beverages as well as for preparing syrups as precursors and for the preparation of such beverages. The disclosure is also about a beverage including said sweetening compositions as well as about a process for preparing such beverage.

15 Claims, No Drawings

SWEETENING COMPOSITIONS

CROSS-REFERENCES TO RELATED APPLICATIONS

This application is a divisional application of U.S. application Ser. No. 15/395,432, filed on Dec. 30, 2016, now U.S. Pat. No. 11,076,619, which application is incorporated herein by reference in its entirety.

BACKGROUND

Technical Field

The present disclosure provides sweetening compositions, their use for the preparation of sweetening syrups and beverages as well as to the preparation of said beverages.

Description of Related Art

Common soft drinks usually contain significant amounts of natural sugars such as sucrose, glucose, fructose or mixtures thereof. The caloric content of these natural sugars usually is in the range from 3.6 to 3.9 kcal/g. Many attempts have been made to reduce the caloric content of beverages such as soft drinks. In some instances natural sugars have been replaced by steviol glycosides. Some steviol glycosides have a sweetening power which is about 240 to 400 times that of natural sugar sucrose. Steviol glycosides are derived from extracts of the leaves of the stevia plant (*Stevia rebaudiana Bertoni*). The four major steviol glycosides found in the leaves of the stevia plant are stevioside (about 5 to 10 wt-%), rebaudioside A (about 2 to 4 wt-%), rebaudioside C (about 1 to 2 wt-%) and dulcoside A (about 0.5 to 1 wt-%). Further steviol glycosides which are found in the extract of the leaves of the stevia plant, however in rather minute quantities, are rebaudioside B, rebaudioside D and rebaudioside E. The common aglycon of all steviol glycosides is steviol which belongs to the class of diterpenes.

Unfortunately, beverages sweetened with steviol glycosides suffer some drawbacks which for many consumers outweigh the caloric content of conventional beverages. Steviol glycosides are known to cause a bitter and licorice-like aftertaste, in some instances also a metallic aftertaste. In addition, the sweet sensation is retarded to some extent, that is, the sweetening exhibit a so-called lingering. In some cases steviol glycosides are also responsible for a blunt or dry-mouth feeling.

In EP 2 519 118 sweetening compositions are disclosed containing a sweetener and at least one sweetness enhancer chosen from terpenes, flavonoids, amino acids, proteins, polyols, other known natural sweeteners, seco-dammarane glycosides, and analogues thereof. Suitable sweetening enhancer are reported to include stevia sweeteners, such as stevioside, steviolbioside, rebaudioside A, rebaudioside B, rebaudioside C, rebaudioside D, rebaudioside F, and dulcoside A. The at least one sweetness enhancer has to be present in the composition in an amount at or below the sweetness detection threshold level of the at least one sweetness enhancer, and the at least one sweetener and the at least one sweetness enhancer are different.

In EP 2 386 211 the use of rubusoside for masking, reducing or suppressing a bitter, sour and astringent taste impression of a bitter, sour and astringent-tasting substance is described. Compositions containing rubusoside shall mask, reduce or suppress in food products and in pharmaceuticals the bitter, sour and astringent taste impression of compounds such as steviosides and rebaudioside A.

And, WO 2008/049256 addresses a sweetened consumable comprising a) at least 0.0001% of at least one sweetener, wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof, wherein said at least one sweetener or sweetener combination is present in a concentration above the sweetness detection threshold in a concentration of at least isosweet to 2% sucrose, and b) at least one sweetness enhancer selected from the group consisting of naringin dihydrochalcone, mogroside V, swingle extract, rubusoside, rubus extract, stevioside, and rebaudioside A. Each sweetness enhancer shall be present in a concentration near its sweetness detection threshold. For naringin dihydrochalcone this concentration shall be from 2 to 60 ppm, for rubusoside from 1.4 ppm to 56 ppm, for rubus extract from 2 ppm to 80 ppm, for mogroside V from 0.4 ppm to 12.5 ppm, for swingle extract from 2 to 60 ppm, for stevioside from 2 to 60 ppm, and for rebaudioside A from 1 to 30 ppm.

Also many other attempts have been made to overcome the afore-mentioned shortcomings of steviol glycoside sweeteners such as a bitter and licorice-like aftertaste, a blunt or dry-mouth feeling and a sweet aftertaste.

For example, according to WO 2012/073121 A2 the bitter aftertaste of steviol glycosides shall be decreased or eliminated by the reduction or elimination of rebaudioside C or dulcoside A or both from stevia compositions. However, it has been found that the reduction of rebaudioside C or dulcoside A as such does not guarantee a reduction in bitter aftertaste. Moreover, even with stevia compositions being void of rebaudioside C or dulcoside A consumers experience a slow onset and sometimes even a longer duration of the sweetness sensation.

In WO 2008/147726 it is described that a more sugar-like flavor profile shall be obtained by sweetener compositions comprising at least a) one sweetness enhancer such as urea or thiourea, b) at least one sweetener comprising a carbohydrate sweetener, a natural high-potency sweetener, a synthetic high-potency sweetener or a combination thereof such as rebaudioside compounds, sucralose, aspartame or acesulfame potassium, and c) at least one sweet taste improving composition selected from the group consisting of carbohydrates, polyols, amino acids, or mixtures thereof.

New sweetened beverage formulations which do not exhibit a bitter aftertaste shall be obtained according to EP 2 474 240 A1 by use of rebaudioside D and an acidulant comprising at least lactic acid and one or both of tartaric acid and citric acid, and no phosphoric acid.

From WO 2011/146463 A2 it can be derived that the bitterness in an otherwise sweet composition containing steviol glycosides shall be masked by incorporating an increased amount, relative to naturally occurring compositions, of rebaudioside D.

EP 2 486 806 A1 discloses a low-calorie orange juice drink which makes use of a mixture of 84 wt-% rebaudioside A and 16 wt-% rebaudioside D. Different from a low-calorie orange juice having been sweetened with a conventional stevia extract a pleasant taste similar to sucrose, a full mouthfeel, and no bitterness and no aftertaste shall be observed during sensory evaluation. A similar outcome was reported for a zero-calorie carbonated beverage.

According to WO 2008/112967 A1 the metallic aftertaste experienced with beverages containing conventional steviol glycosides shall be masked by the presence of anisic acid.

And, in WO 2012/109585 A1 it is disclosed that attributes such as bitterness, sweet aftertaste and licorice flavor of steviol glycosides may be overcome by sweetening compositions comprising a blend of rebaudioside A, rebaudioside B and steviol glycosides, in some cases when the ratio of rebaudioside B to total steviol glycosides in the blend ranges from 0.5% to about 50% and in some further cases from about 5% to about 40%.

Sucrose being the standard natural sweetener has a characteristic time and intensity sweetness profile. While some artificial sweeteners have a more rapid onset of sweetness than sucrose, most artificial sweeteners such as stevia compounds have not only a significantly slower onset but also exhibit a significantly longer linger than sucrose. The aforementioned drawbacks associated with the use of steviol glycosides are still not overcome to a satisfactory extent. It is therefore desirable to obtain beverages, which contain less or no natural sweeteners, and which have a much improved sweetness and aroma profile.

There is accordingly a need to provide low-calorie beverages which do not exhibit a delayed onset of the sensation of sweetness and an extended lingering and which, optionally, also do not suffer from a bitter or licorice-like aftertaste and/or which do not cause a blunt or dry-mouth feeling. Hence, it has been a major goal of the present disclosure to attain a temporal sweetening profile similar or even essentially identical to that of natural sugar, i.e., a natural sweetening profile, in particular with respect to both the onset of sweetness and its lingering time.

BRIEF SUMMARY

Accordingly, the present disclosure provides a sweetening composition according to a first embodiment comprising a) at least one natural sweet-tasting carbohydrate, b) at least one stevia compound, c) one or more sweetness modifier selected from the group consisting of rubusoside, at least one rubusoside derivative, neohesperidin, thaumatine, phloretin, trilobatin, monatin, hesperetin, and at least one enzyme-treated steviol glycoside (in particular rubusoside or at least one rubusoside derivative or neohesperidin or at least one enzyme-treated steviol glycoside or any combination thereof), and d) at least one tannin, in some cases tannic acid and/or at least one tannic acid derivative or a composition or extract containing tannic acid and/or at least one tannic acid derivative in an amount, based on the at least one tannin, in some cases tannic acid and the at least one tannic acid derivative.

With said first embodiment the at least one tannin, in some cases tannic acid and/or at least one tannic acid derivative or a composition or extract containing tannic acid and/or at least one tannic acid derivative, are to be present in an amount, based on the at least one tannin, in some cases tannic acid and the at least one tannic acid derivative, in the range from 1 mg/l to 400 mg/l, in some further cases in the range from 10 mg/l to 300 mg/l and in some other cases in the range from 25 to 250 mg/l, if the composition of said first embodiment is an aqueous composition, in particular in the form of a beverage.

Alternatively or simultaneously, said first embodiment of a sweetening composition can be characterized in that, based on the total weight of component b), component c), in particular the rubusoside and/or at least one rubusoside derivative, and component d), in particular tannic acid and/or at least one tannic acid derivative, the component b) is present in an amount in the range from 45 to 75 wt-%, the component c), in particular the rubusoside and/or at least one rubusoside derivative, is present in an amount in the range from 2 to 40 wt-%, and the component d), in particular tannic acid and/or at least one tannic acid derivative, is present in an amount in the range from 2 to 40 wt-%, wherein in each case the sum of components b), c) and d) always adds up to 100 wt-%. The weight ranges are optionally applicable for an alternative embodiment in which the composition of said first embodiment represents a dry mixture, in particular in powder and/or particulate form.

DETAILED DESCRIPTION

According to a variant of the aforementioned alternate forms of the first embodiment of a sweetening composition, based on the total weight of component b), component c), in particular the rubusoside and/or at least one rubusoside derivative, and component d), in particular tannic acid and/or at least one tannic acid derivative, the component b) is present in an amount in the range from 50 to 70 wt-%, in some cases 55 to 65 wt-%, the component c), in particular the rubusoside and/or at least one rubusoside derivative, is present in an amount in the range from 5 to 35 wt-%, in some cases 10 to 30 wt-%, and the component d), in particular tannic acid and/or at least one tannic acid derivative, is present in an amount in the range from 5 to 35 wt-%, in some cases 10 to 30 wt-%, wherein in each case the sum of components b), c) and d) always adds up to 100 wt-0.

The at least one natural sweet-tasting carbohydrate of the first embodiment in particular is sucrose. And, among the at least one stevia compound of the first embodiment those are suited in some cases which are selected from the group consisting of steviol glycosides, rebaudiosides and mixtures thereof.

Tannins in the meaning of the present disclosure shall comprise polyphenols, in some cases so-called plant polyphenols, which exhibit an astringent sensation. It is presently believed that said astringent sensation is caused by or associated with a binding reaction of said polyphenols to proteins. For example, tannic acid coagulates albumen and gelatin. Tannins usually have two or three phenolic hydroxyl groups on the phenyl ring. Tannins can, for example, be classified into pyrogallol type tannins and the catechol type tannins. Tannins can also be classified into so-called hydrolysable tannins, e.g., based on ellagic acid and gallic acid, and condensed tannins, e.g., based on catechol. Tannins of the present disclosure can be derived from any of the aforementioned classified groups.

Suitable tannins encompass for example ellagitannins, such as punicalagin and geranii, and gallotannins which belong to the class of hydrolysable tannins, as well as stilbenoids such as astringin or resveratrol. Ellagitannins usually contain various numbers of hexahydroxydiphenoyl (HHDP) units, as well as galloyl units and/or sanguisorboyl units bound to sugar moiety. Suitable representatives of tannins also comprise epigallocatechin gallate, epicatechin gallate, and phlorotannins.

Tannins can for example be obtained from extracts of oak or of pomegranates, in some cases pomegranate rind extracts. For example, gallic acid is found in gallnuts, sumac, witch hazel, tea leaves and oak bark.

The composition or extract containing at least one tannin, in particular tannic acid and/or at least one tannic acid derivative, can be derived from seeds, bark, cones, husk, and/or heartwood of oak, pomegranate, chestnut, gallnut or mimosa, in particular from oak or pomegranate.

Tannic acid in the meaning of the present disclosure in some cases comprises polygalloyl glucoses and polygalloyl quinic acid esters with the number of galloyl moieties per molecule in some cases ranging from 2 up to 12, in some further cases from 3 to 12, e.g., decagalloyl glucose. Accordingly, tannic acid in the meaning of the present disclosure can be understood to be, for example, formed of gallic acid molecules and glucose. Tannic acid will usually hydrolyze into glucose and gallic acid and/or ellagic acid units. In general, with the term tannic acid both an individual compound as well as a mixture of two or more compounds is meant.

Enzyme-treated steviol glycosides include those steviol glycosides having been treated with, for example, cyclomaltodextrin glucanotransferase (CGTase).

The compounds of component c) of the first embodiment of the present disclosure, in particular rubusoside or a rubusoside derivative or neohesperidin or enzyme-treated steviol glycosides, and even more particular rubusoside, have been found with the compositions of the present disclosure to assist in improving its sweetening profile at the onset so that the sweetening sensation is shifted towards the actual consumption of the sweetening composition of a product containing said sweetening composition of the first embodiment of the present disclosure.

Rubusoside (CAS No: 64849-39-4) can be found in leaves of *Rubus suavissimus* S. Lee (Chinese sweet leaf). Rubusosides in the meaning of the present disclosure shall also comprise enzymatically-treated rubusosides.

With the sweetening compositions according to said first embodiment it is in some cases pragmatic that the at least one natural sweet-tasting carbohydrate, in particular sucrose, is present in an amount in the range from 5 to 80 g/l, in some cases in the range from 15 g/l to 70 g/l and in some further cases in the range from 25 to 55 g/l. Alternatively or in addition in said sweetening compositions of the first embodiment rubusoside and/or at least one rubusoside derivative in some cases is present in an amount in the range from 20 to 200 mg/l, in some further cases in the range from 20 mg/l to 150 mg/l and in some other cases in the range from 30 to 125 mg/l.

Accordingly, the present disclosure also provides a sweetening composition, also referred to as second embodiment of a sweetening composition of the present disclosure, comprising a) at least one natural sweet-tasting carbohydrate, in particular sucrose, b) at least one stevia compound, in some cases selected from the group consisting of steviol glycosides, rebaudiosides and mixtures thereof, c) rubusoside and/or at least one rubusoside derivative and/or neohesperidin and/or thaumatine and/or phloretin and/or trilobatin and/or monatin and/or hesperetin and/or at least one enzyme-treated steviol glycoside, in particular rubusoside or at least one rubusoside derivative or neohesperidin or at least one enzyme-treated steviol glycoside or any combination thereof, d) tannic acid and/or at least one tannic acid derivative and e) oak extract and/or pomegranate extract.

In said second embodiment of the sweetening composition of the present disclosure the at least one natural sweet-tasting carbohydrate, in particular sucrose, is in some cases present in an amount in the range from 5 to 80 g/l, in some further cases in the range from 15 g/l to 70 g/l and in some other cases in the range from 25 to 55 g/l. Alternatively or in addition in said sweetening compositions of the second embodiment rubusoside and/or at least one rubusoside derivative is in some cases present in an amount in the range from 20 to 200 mg/l, in some further cases in the range from 20 mg/l to 150 mg/l and in some other cases in the range from 30 to 125 mg/l. And, again, alternatively or in addition in said second embodiment of the sweetening composition of the present disclosure the total amount of tannic acid and/or at least one tannic acid derivative is in some cases present in an amount in the range from 1 mg/l to 400 mg/l, in some further cases in the range from 10 mg/l to 300 mg/l and in some other cases in the range from 25 to 250 mg/l.

Accordingly, the present disclosure also provides a sweetening composition, also referred to as third embodiment of a sweetening composition of the present disclosure, comprising a) acesulfam and/or aspartam, in particular acesulfam, b) sucralose and/or at least one stevia compound, in some cases selected from the group consisting of steviol glycosides, rebaudiosides and mixtures thereof, and/or saccharin and/or cyclamate, c) neohesperidin and/or thaumatine and/or rubusoside and/or at least one rubusoside derivative and/or phloretin and/or trilobatin and/or monatin and/or hesperetin, d) at least one tannin, in particular tannic acid and/or at least one tannic acid derivative or a composition or extract containing tannic acid and/or at least one tannic acid derivative.

In this third embodiment component d), based on the at least one tannin, in particular tannic acid and the at least one tannic acid derivative, is present in an amount in the range from 1 mg/l to 400 mg/l, in some cases in the range from 10 mg/l to 300 mg/l and in some further cases in the range from 25 to 250 mg/l.

Such a sweetening composition according to the third embodiment of the present disclosure is rather suitable in some cases which comprises a) acesulfam and/or aspartame, in particular acesulfam, b) sucralose or saccharin or at least one stevia compound, in some cases selected from the group consisting of steviol glycosides, rebaudiosides and mixtures thereof, c) neohesperidin, and d) at least one tannin, in particular tannic acid and/or at least one tannic acid derivative or a composition or extract containing tannic acid and/or at least one tannic acid derivative, wherein component d), based on the at least one tannin, in particular tannic acid and the at least one tannic acid derivative, is present in an amount in the range from 1 mg/l to 400 mg/l, in some cases in the range from 10 mg/l to 300 mg/l and in some further cases in the range from 25 to 250 mg/l if the composition of said third embodiment is an aqueous composition, in particular in the form of a beverage.

Alternatively or simultaneously, said third embodiment of a sweetening composition can be characterized in that, based on the total weight of component a), in particular acesulfam, component b), in particular sucralose, component c), in particular neohesperidine, and component d), in particular tannic acid and/or at least one tannic acid derivative, the component a) is present in an amount in the range from 10 to 50 wt-%, the component b) is present in an amount in the range from 15 to 65 wt-%, the component c) is present in an amount in the range from 0.1 to 4 wt-%, and the component d) is present in an amount in the range from 5 to 50 wt-%, wherein in each case the sum of components a, b), c) and d) always adds up to 100 wt-%.

According to another embodiment the aforementioned alternate forms of the third embodiment of a sweetening composition, based on the total weight of component a), in particular acesulfam, component b), in particular sucralose, component c), in particular neohesperidine, and component d), in particular tannic acid and/or at least one tannic acid derivative, the component a) is present in an amount in the range from 15 to 45 wt-%, in some cases 20 to 40 wt-%, the component b) is present in an amount in the range from 20 to 55 wt-%, in some cases 30 to 45 wt-%, the component c) is present in an amount in the range from 0.2 to 3 wt-%, in some cases 0.5 to 2 wt-%, and the component d) is present in an amount in the range from 10 to 40 wt-%, in some cases 15 to 35 wt-%, wherein in each case the sum of components a), b), c) and d) always adds up to 100 wt-%, Particularly preferable results as to an improved sweetening profile, i.e., a sweetening profile coming close to or being even essentially identical to that of natural sugar, that is a so-called natural sweetening profile, is obtained with the third embodiment of the sweetening composition of the present disclosure in which component b) comprises or consists of sucralose, saccharin and cyclamate or, alternatively, in which component b) comprises or consists of at least one stevia compound, in some cases selected from the group consisting of steviol glycosides, rebaudiosides and mixtures thereof, saccharin and cyclamate.

In the sweetening compositions of the third embodiment of the present disclosure, in particular in the form of an aqueous composition, such as in the form of a beverage, acesulfam and/or aspartame is in some cases present in an amount in the range from 25 to 250 mg/l, in some further cases in the range from 50 to 200 mg/l and in some other cases in the range from 75 to 150 mg/l. Alternatively or in addition, in said sweetening compositions of the third embodiment of the present disclosure sucralose in some cases is present in an amount in the range from 20 to 750 mg/l, in some further cases in the range from 40 mg/l to 550 mg/l and in some other cases in the range from 60 to 450 mg/l. And, alternatively or in addition, in said sweetening compositions of the third embodiment of the present disclosure, and also in another embodiment of the first and second embodiment, neohesperidin in some cases is present in an amount in the range from 0.01 mg/l to 20 mg/l, in some further cases in the range from 0.1 mg/l to 15 mg/l and in some other cases in the range from 1.0 to 10 mg/l. Alternatively or in addition, in said sweetening compositions of the third embodiment of the present disclosure saccharin in some cases is present in an amount in the range from 10 mg/l to 750 mg/l, in some further cases in the range from 20 mg/l to 500 mg/l and in some other cases in the range from 30 to 400 mg/l. And, alternatively or in addition, in said sweetening compositions of the third embodiment of the present disclosure cyclamate in some cases is present in an amount in the range from 10 mg/l to 500 mg/l, in some further cases in the range from 50 mg/l to 300 mg/l and in some other cases in the range from 75 to 200 mg/l. And, alternatively or in addition, in said sweetening compositions of the third embodiment of the present disclosure, and also in another embodiment of the first and second embodiment, thaumatine in some cases is present in an amount in the range from 0.01 mg/l to 10 mg/l, in some further cases in the range from 0.05 mg/l to 5 mg/l and in some other cases in the range from 0.1 to 2 mg/l. And, alternatively or in addition, in said sweetening compositions of the third embodiment of the present disclosure rubusoside and/or at least one rubusoside derivative in some cases is present in an amount in the range from 5 to 200 mg/l, in some further cases in the range from 10 mg/l to 150 mg/l and in some other cases in the range from 20 to 125 mg/l. And, alternatively or in addition, in said sweetening compositions of the third embodiment of the present disclosure, and also in another embodiment of the first and second embodiment, phloretin in some cases is present in an amount in the range from 1 to 250 mg/l, in some further cases in the range from 5 mg/l to 200 mg/l and in some other cases in the range from 10 to 150 mg/l. And, alternatively or in addition, in said sweetening compositions of the third embodiment of the present disclosure, and also in a in some cases rather suitable embodiment of the first and second embodiment, trilobatin in some cases is present in an amount in the range from 0.1 to 250 mg/l, in some further cases in the range from 1 mg/l to 200 mg/l and in some further cases in the range from 5 to 150 mg/l. And, alternatively or in addition, in said sweetening compositions of the third embodiment of the present disclosure, and also in another embodiment of the first and second embodiment, monatin in some cases is present in an amount in the range from 0.01 mg/l to 20 mg/l, in some further cases in the range from 0.1 mg/l to 10 mg/l and in some other cases in the range from 0.05 to 5 mg/l. And, alternatively or in addition, in said sweetening compositions of the third embodiment of the present disclosure hesperetin in some cases is present in an amount in the range from 1 to 750 mg/l, in some further cases in the range from 10 mg/l to 500 mg/l and in some other cases in the range from 25 to 250 mg/l.

In the sweetening compositions according to the first, second and third embodiment of the present disclosure the at least one stevia compound in some cases is a mixture comprising or consisting of, rebaudioside A, rebaudioside B and rebaudioside D wherein, based on the total weight of rebaudioside A, rebaudioside B and rebaudioside D, rebaudioside A is present in an amount in the range from 80.0 to 99.0 wt-%, rebaudioside B is present in an amount in the range from 0.1 to 1.5 wt-%, and rebaudioside D is present in an amount in the range from 0.9 to 18.5 wt-%.

Moreover, in the sweetening compositions according to the first, second and third embodiment of the present disclosure the at least one stevia compound in some other cases is a mixture comprising or consisting of, rebaudioside A, rebaudioside B and rebaudioside D wherein, based on the total weight of rebaudioside A, rebaudioside B and rebaudioside D, rebaudioside A is present in an amount in the range from 85.0 to 95.0 wt-%, rebaudioside B is present in an amount in the range from 0.2 to 1.2 wt-%, and rebaudioside D is present in an amount in the range from 4.8 to 13.8 wt-%.

Furthermore, in the sweetening compositions according to the first, second and third embodiment of the present disclosure rebaudioside A is present in an amount in the range from 86.0 to 94.3 wt-%, rebaudioside B is present in an amount in the range from 0.3 to 0.9 wt-%, and rebaudioside D is present in an amount in the range from 5.4 to 13.1 wt-%, in each case based on the total weight of rebaudioside A, rebaudioside B and rebaudioside D.

In another version of the sweetening compositions according to the first, second and third embodiment of the present disclosure rebaudioside A is present in an amount in the range from 90.5 to 94.0 wt-%, rebaudioside B is present in amount in the range from 0.2 to 1.0 wt-% and rebaudioside D is present in amount in the range from 5.8 to 8.5 wt-%, based on the total weight of rebaudioside A, rebaudioside B and rebaudioside D, or rebaudioside A is present in an amount in the range from 90.9 to 94.4 wt-%, rebaudioside B is present in amount in the range from 0.2 to 0.5 wt-% and rebaudioside D is present in amount in the range from 5.4 to 8.6 wt-%, in each case based on the total weight of rebaudioside A, rebaudioside B and rebaudioside D. Steviolglycosides such as rebaudioside A, rebaudioside B, rebaudioside D, rebaudioside C, rebaudioside E, rebaudioside F, stevioside, dulcoside, rubusoside and steviolbioside can be detected and determined according to HPLC-UV as specified in JECFA (2010) Steviol Glycosides, FAO JECFA Monograph 10, FAO, Rome.

Accordingly, the present disclosure also provides a sweetening composition, also referred to as fourth embodiment of a sweetening composition of the present disclosure, comprising a) 0.1 to 50 g/l of a natural sweet-tasting carbohydrate, in particular selected from the group consisting of natural sweet-tasting monosaccharides, b) 40 to 120 g/l of a natural sweet-tasting carbohydrate different from a), in particular selected from the group consisting of natural sweet-tasting disaccharides, and c) 30 to 300 mg/l rubusoside and/or at least one rubusoside derivative and/or 0.01 mg/l to 20 mg/l, in some cases in the range from 0.1 mg/l to 15 mg/l and in some further cases in the range from 1.0 to 10 mg/l neohesperidin, or 0.01 mg/l to 10 mg/l, in some cases in the range from 0.05 mg/l to 5 mg/l and in some further cases in the range from 0.1 to 2 mg/l thaumatine, or 1 to 250 mg/l, in some cases in the range from 5 mg/l to 200 mg/l and in some further cases in the range from 10 to 150 mg/l phloretin, or 0.1 to 250 mg/l, in some cases in the range from 1 mg/l to 200 mg/l and in some further cases in the range from 5 to 150 mg/l trilobatin, or 0.01 mg/l to 20 mg/l, in some cases in the range from 0.1 mg/l to 10 mg/l and in some further cases in the range from 0.05 to 5 mg/l monatin, or 1 to 750 mg/l, in some cases in the range from 10 mg/l to 500 mg/l and in some further cases in the range from 25 to 250 mg/l hesperetin, or at least one enzyme-treated steviol glycoside or any mixture thereof, in particular rubusoside and/or at least one rubusoside derivative and/or neohesperidin and/or at least one enzyme-treated steviol glycoside.

Said versions of the fourth embodiment of the present disclosure are in some cases rather suitable which comprise a) 0.5 to 30 g/l of a natural sweet-tasting carbohydrate selected from the group consisting of natural sweet-tasting monosaccharides, b) 70 to 110 g/l of a natural sweet-tasting carbohydrate selected from the group consisting of natural sweet-tasting disaccharides, and c) 40 to 220 mg/l rubusoside and/or at least one rubusoside derivative or 0.1 mg/l to 15 mg/l and in some cases 1.0 to 10 mg/l neohesperidin, or 0.05 mg/l to 5 mg/l and in some cases 0.1 to 2 mg/l thaumatine or 5 mg/l to 200 mg/l and in some cases 10 to 150 mg/l phloretin or 1 mg/l to 200 mg/l and in some cases 5 to 150 mg/l trilobatin or 0.1 mg/l to 10 mg/l and in some cases 0.05 to 5 mg/l monatin or 10 mg/l to 500 mg/l and in some cases 25 to 250 mg/l hesperetin.

In the sweetening compositions of the first to fourth embodiment of the present disclosure the at least one natural sweet-tasting carbohydrate in some cases is selected from the group consisting of a natural sweet-tasting monosaccharide, a natural sweet-tasting disaccharide, a sweet-tasting sugar alcohol and a mixture thereof. While said the sweet-tasting natural monosaccharide in some cases is selected from the group consisting of fructose, glucose, mannose, rhamnose, xylose, tagatose, galactose, and mixtures thereof, said sweet-tasting natural disaccharide is in some cases selected from the group consisting of sucrose, lactose, maltose and mixtures thereof. Moreover, said sweet-tasting sugar alcohol in some cases is selected from the group consisting of erythritol, glycerol, lactitol, maltitol, mannitol, sorbitol, xylitol, galactitol and mixtures thereof.

With the sweetening compositions of the first to fourth embodiment of the present disclosure in some cases sucrose is used as the sweet-tasting natural disaccharide.

The sweetening compositions of the first to fourth embodiment of the present disclosure can further comprise at least one flavoring ingredient selected from the group consisting of galangal, cocoa, cinnamon, lemon, lemon juice concentrate, coca leaf, orange, orange oil, corn mint, pine, cardamom, mace, clove, lime, lime oil, nutmeg, nutmeg oil, mustard seeds, mustard seed oil, caramel, rosemary, pepper, honey, ginger, vanilla, licorice, licorice extract, cola nut and cola nut extract or mixtures thereof.

In another in some cases rather suited embodiment the sweetening compositions of the first to fourth embodiment of the present disclosure further comprise taurine and/or caffeine. Accordingly, the sweetening compositions of the first to fourth embodiment of the present disclosure can be used for sweetening beverages, in some cases soft drinks or energy drinks.

Interestingly, the sweetening compositions of the present disclosure are also suited to prepare precursor compositions in the form of a syrup which can be easily stored and transported and can be used on demand for the preparation of carbonated beverages.

Accordingly, the present disclosure also provides a beverage comprising a sweetening composition according to any of the first to fourth embodiment of the present disclosure. Here, the sweetening composition according to any of the first to fourth embodiments of the present disclosure can already as such represent an aqueous composition such as a beverage. Alternatively, said sweetening composition according to any of the first to fourth embodiments of the present disclosure, without added water present, can also represent a dry mixture, e.g., in powder and/or particulate form. However, even if the sweetening composition according to any of the first to fourth embodiments of the present disclosure represent aqueous compositions still further ingredients such as flavors or thickening agents may be added to form, for example, a commercial beverage.

Suitable beverages according to some exemplary embodiments are characterized in that rebaudioside A, B and D in combination are present in the beverage in a concentration in the range from 0.01 to 1.0 g/l, in some cases from 0.05 to 0.75 g/l and in some further cases from 0.1 to 0.6 g/l (determined at ambient temperature and 1 bar).

Also those beverages according to the present disclosure are in some cases rather suited in which the sweet-tasting natural carbohydrates and the sweet-tasting sugar alcohols are present in combination in the beverage in a concentration not above 40 g/l, in some cases in the range from 5 g/l to 35 g/l and in some further cases in the range from 10 g/l to 25 g/l (determined at ambient temperature and 1 bar). Ambient temperature in the meaning of the present disclosure shall mean room temperature, i.e., a temperature in the range from 20° C. to 25° C.

The beverages of the present disclosure comprise carbonated and non-carbonated soft drinks and energy drinks. Suitable soft drinks also include cola-flavored soft drinks, wherein cola-flavored soft drinks also encompass cola-flavored-type soft drinks. Also these beverages, when being sweetened with the sweetening composition in accordance with the present disclosure, do not or do essentially not exhibit a slow onset of the sensation of sweetness but provide a rather harmonic sweetening profile and do not or do essentially not have a bitter or licorice-like aftertaste.

It is another benefit of sweetening compositions of the first to fourth embodiment of the present disclosure that beverages can be obtained which, if at all, contain natural sugars such as sweet-tasting carbohydrates and/or sweet-tasting sugar alcohols in a very reduced amount.

The sweetening compositions of the first to fourth embodiment of present disclosure can also comprise, for example when used with energy drinks, further ingredients such as sodium citrate, glucoronolactone, inositol, at least one vitamin, e.g., niacin, pantothenic acid, vitamin B6, vitamin B12, riboflavin, caustic caramel, caustic sulfite caramel, ammonia caramel, sulfite ammonia caramel or ascorbic acid or mixtures thereof.

The sweetening composition of the present disclosure can be used for sweetening beverages such as soft drinks or energy drinks. The beneficial effects coming along with the use of the sweetening composition of the present disclosure can also be accomplished with carbonated beverages.

The sweetening composition according to the various embodiments of the present disclosure may also be used solely to modify the sweetening profile of an already sweetened product without significantly contributing to or adding to the sweetening sensation.

Accordingly, the present disclosure also provides a method comprising the steps of a) providing a sweetening composition according to the any one of the first to fourth embodiments of the present disclosure, b) providing water and c) mixing components provided under a) and b). The process of the present disclosure particularly further comprises the step (step d)) of carbonating the beverage.

According to another embodiment, the process of the present disclosure can further comprise the step of adding at least one thickening agent, at least one sweet-tasting natural carbohydrate, at least one sweet-tasting sugar alcohol, at least one organic acid and/or at least one flavoring ingredient to the sweetening composition according to the first to fourth embodiment of the present disclosure or to a mixture comprising water and one of said sweetening compositions of the present disclosure. The aforementioned components may also be added to water prior to mixing with any of said sweetening compositions of the present disclosure. Here, the definitions provided above for thickening agent, sweet-tasting natural carbohydrate, sweet-tasting sugar alcohol, organic acid and flavoring ingredient are applicable as well both in terms of general information and specific embodiments.

Furthermore, it is also possible that the sweet-tasting natural carbohydrates and/or at least one sweet-tasting sugar alcohol are added to the mixture comprising water and one of the first to fourth embodiment of the sweetening compositions of the present disclosure prior to and/or after the carbonating step, in some cases suitably prior to the carbonating step.

The first to fourth embodiments of the sweetening compositions of the present disclosure as well as the beverages of the present disclosure, e.g., soft drinks or energy drinks, in one embodiment can also comprise common additives such as amino acids, coloring agents, bulking agents, modified starches, texturizers, preservatives, antioxidants, emulsifiers, stabilizers, gelling agents or arbitrary mixtures thereof.

With the present disclosure it has been surprisingly found that sweetening compositions are accessible which do not exhibit a slow onset in the sweetening sensation. As an additional effect it is also possible to arrive at such sweetening compositions which do not have a bitter aftertaste and/or which also do not have a metallic aftertaste. Moreover, it has surprisingly been found that with the sweetening compositions of the present disclosure an aroma or sweetening profile can be accomplished which resembles that of beverages having been sweetened with natural sugars, even with carbonated beverages. Furthermore, it has surprisingly been found that with at least one tannin, in particular tannic acid and/or tannic acid derivatives, being present in the compositions of the present disclosure the long-lasting sweetening sensations of artificial sweeteners as, for example, stevia compounds can be shortened furnishing a natural or an essential natural sweetening sensation, that is a sweetening profile regularly caused by known high caloric sugars.

It is, thus, possible with the sweetening composition of the present disclosure to prepare beverages, such as carbonated beverages, e.g., soft drinks and energy drinks which though having a significantly reduced caloric content exhibit an improved sweetness and aroma profile and which at least in some embodiments also do not differ significantly in their taste from conventional beverages having been sweetened with natural sugars and/or artificial sweeteners. This also includes that a sweetened sensation is perceived by the consumer already at the very beginning. In addition, with the sweetening composition of the present disclosure beverages can be obtained which do not have an insipid or blunt taste or dry-mouth feeling.

In the meaning of the present disclosure artificial sweeteners shall comprise all sweeteners different from natural sweeteners such as natural monosaccharide and disaccharide sweeteners, e.g., glucose and sucrose.

The beverages of the present disclosure comprise carbonated and non-carbonated drinks such as soft drinks and energy drinks. Suitable soft drinks also include cola-flavored soft drinks, wherein cola-flavored soft drinks also encompass cola-flavored-type soft drinks. Also these beverages, when being sweetened with the sweetening composition in accordance with the present disclosure, do not or do essentially not exhibit a slow onset of the sensation of sweetness but provide a rather harmonic sweetening profile and do not or do essentially not have a bitter or licorice-like aftertaste.

That is, with the present disclosure, such as with the combined use of rubusoside and/or at least one rubusoside derivative and/or neohesperidin and/or thaumatine and/or phloretin and/or trilobatin and/or monatin and/or hesperetin and/or at least one enzyme-treated steviol glycoside, in particular rubusoside and/or at least one rubusoside derivative, and at least one tannin, in particular tannic acid and/or a tannic acid derivative, beverages are accessible which though having been sweetened or co-sweetened with artificial sweeteners such as stevia compounds exhibit a temporal sweetness profile as to onset time, duration, i.e., linger, and, if need be, intensity of sweetness being rather similar to that of sucrose. Accordingly, the present disclosure not only allows shifting the slow onset of, for example, stevia compounds towards that of sucrose, i.e., thereby exhibiting a more rapid onset, but also aids in significantly reducing the lingering effect.

Although modifications and changes maybe suggested by those skilled in the art, it is the intention of the applicant to embody within the patent warranted hereon all changes and modifications as reasonably and probably come within the scope of this contribution to the art. The features of the present disclosure which are believed to be novel are set forth in detail in the appended claims. The features disclosed in the description and in the claims could be essential alone or in every combination for the realization of the invention in its different embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sweetening composition comprising:
   a) acesulfam or aspartame,
   b) sucralose, at least one stevia compound, saccharin or cyclamate,
   c) one or more sweetness modifiers selected from the group consisting of neohesperidin, thaumatine, rubusoside, at least one rubusoside derivative, phloretin, trilobatin, monatin and hesperetin,
   d) at least one tannin,
   wherein, based on the total weight of component a), component b), component c), and component d), the component a) is present in an amount in the range from 10 to 50 wt-%, the component b) is present in an amount in the range from 15 to 65 wt-%, the component c) is present in an amount in the range from 0.1 to 4 wt-%, and the component d) is present in an amount in the range from 5 to 50 wt-%, wherein the sum of components a, b), c) and d) adds up to 100 wt-%.

2. The sweetening composition according to claim 1, wherein, based on the total weight of component a), component b), component c), and component d), the component a) is present in an amount in the range from 15 to 45 wt-%, the component b) is present in an amount in the range from 20 to 55 wt-%, the component c) is present in an amount in the range from 0.2 to 3 wt-%, and the component d) is present in an amount in the range from 10 to 40 wt-%, wherein the sum of components a), b), c) and d) adds up to 100 wt-%.

3. The sweetening composition according to claim 1, wherein component b) comprises sucralose, saccharin and cyclamate; or wherein component b) comprises at least one stevia compound, saccharin and cyclamate.

4. The sweetening composition according to claim 1, wherein the at least one stevia compound is a mixture comprising rebaudioside A, rebaudioside B and rebaudioside D wherein, based on a total weight of rebaudioside A, rebaudioside B and rebaudioside D, rebaudioside A is present in an amount in the range from 80.0 to 99.0 wt-%, rebaudioside B is present in an amount in the range from 0.1 to 1.5 wt-%, and rebaudioside D is present in an amount in the range from 0.9 to 18.5 wt-%.

5. The sweetening composition according to claim 4, wherein,
   based on the total weight of rebaudioside A, rebaudioside B and rebaudioside D,
      rebaudioside A is present in an amount in the range from 90.5 to 94.0 wt-%,
      rebaudioside B is present in amount in the range from 0.2 to 1.0 wt-% and
      rebaudioside D is present in an amount in the range from 5.8 to 8.5 wt-%; or
   wherein, based on the total weight of rebaudioside A, rebaudioside B and rebaudioside D,
      rebaudioside A is present in an amount in the range from 90.9 to 94.4 wt-%,
      rebaudioside B is present in amount in the range from 0.2 to 0.5 wt-% and
      rebaudioside D is present in an amount in the range from 5.4 to 8.6 wt-%.

6. The sweetening composition according to claim 1, wherein said composition is a dry mixture in powder or particulate form.

7. The sweetening composition according to claim 1, further comprising water, wherein component d) is present in an amount ranging from 1 mg/l to 400 mg/l.

8. The sweetening composition according to claim 7, wherein
   acesulfam or aspartame is present in an amount in the range from 25 to 250 mg/l, or wherein,
   sucralose is present in an amount in the range from 20 to 750 mg/l, or wherein
   saccharin is present in an amount in the range from 10 mg/l to 750 mg/l or wherein
   cyclamate is present in an amount in the range from 10 mg/l to 500 mg/l.

9. The sweetening composition according to claim 7, wherein rubusoside or at least one rubusoside derivative is present in an amount in the range from 5 to 200 mg/l, or wherein neohesperidin is present in an amount in the range from 0.01 mg/l to 20 mg/l, or wherein thaumatine is present in an amount in the range from 0.01 mg/l to 10 mg/l, or wherein phloretin is present in an amount in the range from 1 to 250 mg/l, or wherein trilobatin is present in an amount in the range from 0.1 to 250 mg/l, or wherein monatin is present in an amount in the range from 0.01 mg/l to 20 mg/l, or wherein hesperetin is present in an amount in the range from 1 to 750 mg/l.

10. A method for sweetening non-carbonated or carbonated beverages comprising incorporating the sweetening composition of claim 1 in a non-carbonated or carbonated beverage.

11. A method for preparing a syrup as a precursor in the preparation of a carbonated or non-carbonated beverage comprising forming the syrup including the sweetening composition of claim 1.

12. A method of for preparing a carbonated or non-carbonated beverage comprising incorporating the sweetening composition of claim 1 into the carbonated or non-carbonated beverage.

13. Carbonated or non-carbonated beverage comprising the sweetening composition according to claim 1.

14. The beverage according to claim 13, wherein
   the beverage comprises rebaudioside A, B and D, which, in combination, are present in the beverage at a concentration in the range from 0.01 to 1.0 g/l, or
   wherein the sweetening composition further comprises sweet-tasting natural carbohydrates and sweet-tasting sugar alcohols, which are present in combination in the beverage at a concentration not above 40 g/l.

15. The beverage according to claim 13, wherein it is a soft drink, a cola-flavored or cola-flavored-type soft drink, or an energy drink.

* * * * *